United States Patent [19]

Marco et al.

[11] Patent Number: 5,856,313
[45] Date of Patent: Jan. 5, 1999

[54] NATURAL CAROB FIBER AND METHOD OF USING SAME

[75] Inventors: Ana Maria Requejo Marco; Baltasar Ruiz-Rosa Calvo de Mora, both of Madrid; Carlos Sanjuan Diaz, Valencia Espana, all of Spain

[73] Assignee: Compania General del Algarrobo de Espana, S.A., Spain

[21] Appl. No.: 604,367

[22] Filed: Feb. 21, 1996

Related U.S. Application Data

[63] Continuation of Ser. No. 218,274, Mar. 25, 1994, abandoned.

[30] Foreign Application Priority Data

Mar. 26, 1993 [ES] Spain ...................................... 9300627

[51] Int. Cl.⁶ .................................................. A61K 35/78
[52] U.S. Cl. .............................. 514/22; 424/195; 426/45
[58] Field of Search ................................ 426/45; 424/195

[56] References Cited

U.S. PATENT DOCUMENTS 4,160,042  7/1979  Farr et al. .
4,948,600  8/1990  Zumbe et al. ............................ 426/45

FOREIGN PATENT DOCUMENTS 0214317  3/1987  European Pat. Off. .

OTHER PUBLICATIONS

Chemical Abstracts AN 1989:455937, Rebole et al., Jan. 1989.
Chemial Abstracts AN 1979:404362, Wuresch, Jan. 1979.

*Primary Examiner*—Keith D. MacMillan
*Attorney, Agent, or Firm*—Ostrolenk, Faber, Gerb & Soffen, LLP

[57] ABSTRACT

A natural carob fiber includes 50–65% lignin, 15–25% cellulose, 15–25% hemicellulose, 0.5–2 % pectin, 3–7% tannins and 4–8% moisture. A method of using the natural carob fiber includes the step of ingesting the natural carob fiber.

2 Claims, 1 Drawing Sheet

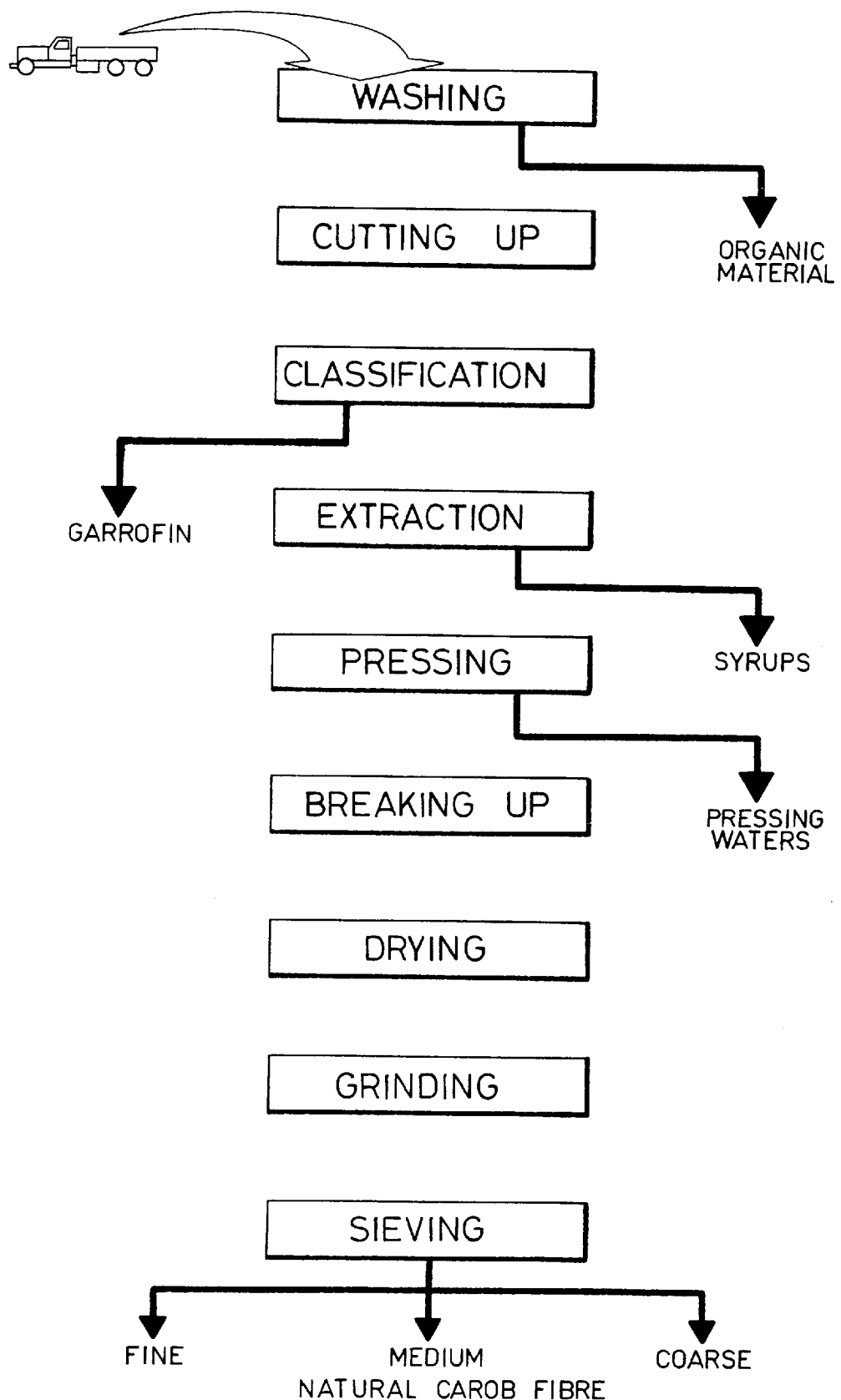

NATURAL CAROB FIBER AND METHOD OF USING SAME

This is a continuation of application Ser. No. 08/218,274, filed on Mar. 25, 1994, now abandoned.

The present invention relates to a new natural product derived from the carob, and which corresponds to the water insoluble fraction of the pulp obtained after eliminating all the water soluble material, followed by drying and grinding to a desired granulometry for an intended market or use.

More particularly, the invention relates to a new natural carob fiber (NCF) and a method for making the new natural carob fiber.

The field of application of the invention corresponds to the dietetics sector and the human food sector.

BACKGROUND OF THE INVENTION

The fibers currently on the market are obtained mainly from cereals and are applied both to the field of dietetics and that of human food.

The effects which fiber has on the diet are well known in the field of nutrition. Equally well recognized is the lack of fiber in modern diets due to changes in traditional dietary customs. Also well known is the influence which fiber has on the capture of fats in the intestines. Furthermore, the relationship between lipaemia and the ingestion of fat is generally accepted nowadays, as is its relationship to cardiovascular morbidity and mortality whilst within this ingestion the cholesterol content and the type of fat in the diet are clear risk factors.

DESCRIPTION OF THE INVENTION

The NCF fibre according to the present invention provides the market with a new product which, since it has the same nutritional characteristics as currently known fibers, practically duplicates the hypocholesterol-aemiant effect, enabling the consequences of modern cholesterol-rich diets to be partially counteracted.

The patent application by the same applying Entity, presented on the same date and entitled "A Syrup Consisting Of The Natural Carob Sugars and A Process For Its Production", describes and claims a new process for extracting and purifying the juice derived from the carob pulp to obtain a natural syrup of the carob sugars and a waste pulp which contains the insoluble fraction of the carob pulp.

The object of the present invention is to provide a new process which, starting with the above mentioned waste pulp, enables a new natural carob fiber (NCF) to be obtained.

Therefore, according to a first aspect, the invention relates to a new process for obtaining the natural carob fiber and includes the following phases:

1. CLEANING THE CAROB

The fruit from the fields is normally accompanied by a series of foreign elements such as stones, twigs, metallic elements, as well as the earth which sticks to the carob, particularly if it was harvested during a rainy period.

The first operation involves cleaning the carob of all of these additional elements by separating the foreign elements mechanically, cleaning the carob with water and drying to obtain the clean fruit, so that the fruit is free of other material such that it is hygienically ready to go on to the cutting up phase.

2. CUTTING UP

Taking advantage of the fragility of the carob and he hardness of the seed (Garrofin), it is passed through a hammer mill where the pod is cut up sufficiently to release the seed. In practice, it is crushed until it passes through a perforated sheet sieve, with a hole diameter of 12 to 20 mm, situated inside the mill.

This phase produces a raw material which fulfils the conditions of hygiene required for food, something which is completely impossible when using the cut up product currently on the market since, because of its traditional use as an ingredient of mixed feed, current installations do not fulfil the minimum sanitary requirements.

3. CLASSIFICATION

The cut up material obtained from the crushing mill is fed continuously into a separator-sieve which includes various sieves which separate the garrofin and the pulp according to whether the particles are less than or equal to or greater than a size of the garrofin. This last fraction is re-fed to the mill in order to obtain a granulometry of less than 10 mm.

A high granulometry prevents a good yield from being obtained in the following phase of diffusion. The considerable formation of flour would obstruct the diffusion process and cause clogging problems.

A particle size of about $5/6$ mm has to be aimed for, with the minimum formation of flour. Obviously the behavior of the fruit during the mechanical process will be different depending on the humidity and agronomic variety, which implies the need for different adjustments.

4. EXTRACTION

The carob pulp, cut up to the appropriate granulometry, is fed into a continuous extraction machine.

The output from this machine is a raw juice, dark brown in color, sweet with a bitter aftertaste and with the characteristic odor of carob. The other output produces a waste pulp soaked in water which contains the insoluble fraction of the carob pulp.

The working conditions in this phase are:

Contact time: The pulp and the diffusion water must be in contact for the minimum amount of time necessary, in order to avoid the proliferation of microorganisms and their corresponding infections. The contact time is between 1 and 3 hours depending on the variety and humidity content, The temperature is between 15 and 30 degrees centigrade.

The working pH is between 4.6 and 5.4, independently of the pH of the water supply.

The output concentration is between 30 and 50 BRIX. Concentrations of less than 30 BRIX are not advisable because of profitability in the evaporation stage, nor are concentrations greater than 50 BRIX recommended due to problems in the filtration process and the passage through the demineralization columns.

5. PRESSING OF WASTE PULP

When the pulp comes out of the diffusor, the water content is very high: 70–80%, i.e. 30–20% Dry Matter. It is essential to press the pulp before it is used in any way.

The pressing process enables a considerable proportion of the water carried by the pulp to be extracted mechanically, the water still containing in solution sugars and various non-sugars. This water is used for extracting the sugars in the previous stage, thereby achieving a considerable savings in water and avoiding undesirable wastage.

An efficient pressing process reduces the water content to 50–60%. i.e. 50–40% dry matter. The water recovered by this procedure may form 37–47% of that carried by the pulp in the diffusion phase.

This operation is carried out using vertical or horizontal double or single helix continuous presses.

The working conditions in this phase are:

Drip time: This depends on the type of press.

The pressing temperature is related to the diffusion output, although considering that the lower the temperature, the higher the dynamic viscosity of the pressing water, It is not beneficial to store between the two operations. A pH of between 6 and 5 can be considered as the optimum value.

6. BREAKING UP

The greater the pressure exerted on the fiber during the pressing operation, the greater the consistency of the fiber obtained as a result, making it difficult to eliminate the moisture which it contains. In order to dry the fiber properly the pressed retort has to be broken up. This is carried out by passing it continuously over a special mill which breaks it up, leaving it in a state in which it can be dried.

The Working conditions in this phase are:

Time: instantaneous and continuous.

Room temperature.

7. DRYING

The moist fiber from the breaking up process is subjected to a drying process to eliminate all excess moisture. This process is carried out in forced hot air current ovens and is followed by cooling down to room temperature.

After the process, the fiber should have a moisture content of less than 5% in order that the grinding process can be carried out under good conditions.

Apart from eliminating the excess water, this operation also eliminates a series of volatile, unanalyzed substances which deodorize the fiber.

The Working conditions in this phase are:

Drying time: depends on the initial moisture content until a reduction to <5%.

Temperature: 120°+/−10° C.

8. GRINDING

The dry fiber is converted into a flour by means of a traditional grinding process.

The Working conditions are:

Granulometry: between 50 and 250 mesh (ASTM E11-70).

9. SIEVING

The flour from the mills is sieved according to the various granulometries using industrial sieving equipment. Under normal conditions the rejected material is re-fed to the grinding operation where it re-enters the circuit.

The suitably sized fiber is packed in sacks or stored and is ready for distribution.

The accompanying drawing FIG. 1 illustrates schematically the process of the invention.

Having described the process of the present invention it only remains to be said that during the course of the process other products are obtained. In phase 3 garrofin is also produced, in phase 4 the raw syrup is produced and in phase 5 the liquid obtained from the pressing process is used in the process of diffusion of the soluble fraction in operation 4.

Consequently, and according to another aspect of the invention, it provides a natural carob fiber (NCF) which is characterized in that it has the following composition:

| | |
|---|---|
| Lignin | 50–65% |
| Cellulose | 15–25% |
| Hemicellulose | 15–25% |
| Pectin | 0.5–2% |
| Tannins | 3–7% |
| Moisture | 4–8% | where the percentages are expressed in weight and are within certain limits depending on the fruit (variety, harvest, agricultural land, etc.), except for the moisture which depends on the applications.

The product of the-invention is distinguished not only by the above mentioned composition but also by the following characteristics:

Physical characteristics:

A flour of varying particle size between 5 and 230 mesh (ASTM E11-70) or 4 and 0.063 mm (DIN 4188) depending on applications and uses. Brown, odorless and completely tasteless.

Nutritional characteristics: According to the results of the research work carried out, the nutritional behavior of the fiber compared to the standard (micro-crystalline cellulose) is similar in every aspect except that it produces a reduction in the assimilation of fat and that the NCF also has a significant hypocholesterol-aemiant effect.

Microbiological characteristics:

It is a practically inert in the development of microorganisms due to its low moisture content.

In order to determine the nutritional behavior of this fiber, and given that there is no specific technical documentation, a series of research experiments were carried out. The goals and results of the experiments which described in the following paragraphs.

First of all, the behavior of the NCF fiber was determined in terms of a number of parameters related to the nutritional exploitation of the diet: ingestion, increase in weight, alimentary efficiency coefficient (AEC) and protein and lipid digestibility.

In normal diets no difference was found between standard fiber (cellulose) and NCF fiber in terms of ingestion, increase in weight, alimentary efficiency coefficient (AEC). A reduction was observed, however, in the Fat Digestibility Coefficient (FDC) due to an increase in the amount of fat eliminated as feces.

Once it was confirmed that the NCF fiber had not only no negative nutritional effect compared with standard fiber (microcrystalline cellulose), but that it added a difference in the behavior relating to fat absorption, a second stage of tests was carried out, again using growing "Wistar" rats, in order to confirm and expand on the previous results, The conclusions drawn from this stage can be summarized as follows:

Independently of the level of fat in the diet, the NCF fiber significantly reduces the increase in weight of animals per gram of material ingested.

Compared to diets containing cellulose, the NCF fiber significantly reduces the absorption of protein but without negative metabolic consequences, since the blocking of amino acid absorption does not appear to be selective on any essential amino acid.

Independently of the lipid content, the absorption of fat in a diet containing NCF fiber is also reduced compared to the control diets containing cellulose.

Under the experimental conditions, the NCF fiber has no negative influence on the absorption of the minerals iron and zinc.

The hepatic deposits of liposoluble vitamins studied, retinol and vitamin E, were not significantly affected in the diets containing NCF compared to the control diets.

The physiological effect produced by the carob pulp was further explored and confirmed in the third stage, the effect producing a significant and important reduction in cholesterolaemia in diets with a high esterol content. Furthermore, it was also confirmed that the NCF fiber did not act in the way described above in the case of rats fed with normal diets.

To do this, four different, isocaloric diets were prepared, adapted to the requirements of the growing rat and in which the only variables were:

1. Dietary fiber. (5%)
   a.—Cellulose.
   b.—NCF fiber
2. Cholesterol ingestion
   a.—Diet without cholesterol
   b.—Diet high in cholesterol (2%)

These diets were fed for 28 days to four groups each containing ten rats born on the same day, checking the ingestion on a daily basis The following parameters were determined individually for each of the tour groups:
   Ingestion
   Increase in weight
   Seric cholesterol The results were statistically treated to establish a level of significance of p ¾ 0.05, confirming the previous results:

There are no differences between the two types of fiber in terms of ingestion and increase in weight.

The increase of seric cholesterol in rats subjected to a high cholesterol diet is, in a group fed with a NCF diet, approximately half that of a group subjected to diets containing the control fiber (microcrystalline cellulose).

This effect was not exhibited in normolitemic rats.

We claim:

1. A fiber composition, consisting essentially of:

| | |
|---|---|
| Lignin | 50–65% |
| Cellulose | 15–25% |
| Hemicellulose | 15–25% |
| Pectin | 0.5–2% |
| Denatured Tannins | 3–7% |
| Moisture | 4–8% | where the percentages are expressed in weight relative to a total weight of the fiber composition.

2. A method of using a fiber composition in dietetic and food applications to lower plasma cholesterol levels, the fiber composition having hypocholesterolaemiant properties and consisting essentially of:

| | |
|---|---|
| Lignin | 50–65% |
| Cellulose | 15–25% |
| Hemicellulose | 15–25% |
| Pectin | 0.5–2% |
| Denatured Tannins | 3–7% |
| Moisture | 4–8% | where the percentages are expressed in weight relative to a total weight of the fiber composition, the method of using the fiber composition comprising the step of:
   ingesting the fiber composition.

* * * * *

UNITED STATES PATENT AND TRADEMARK OFFICE
CERTIFICATE OF CORRRECTION

PATENT NO. : 5,856,313
DATED : January 5, 1999
INVENTOR(S) : Ana Maria Requejo Marco, et al.

It is certified that error appears in the above-identified patent and that said Letters Patent is hereby corrected as shown below:

On the title page, under item [56], insert the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 2 | 3 | 9 | 8 | 4 | 6 | 3 | 2/23/79 | France | | | | |
| | | 1 | 1 | 8 | 1 | 9 | 2 | 4 | | Italy | | | | |

Signed and Sealed this

Twenty-seventh Day of April, 1999

Attest:

Attesting Officer

Q. TODD DICKINSON

Acting Commissioner of Patents and Trademarks